May 12, 1931.  F. H. JONES  1,804,878
FRICTION CLUTCH DISK
Filed Oct. 29, 1929
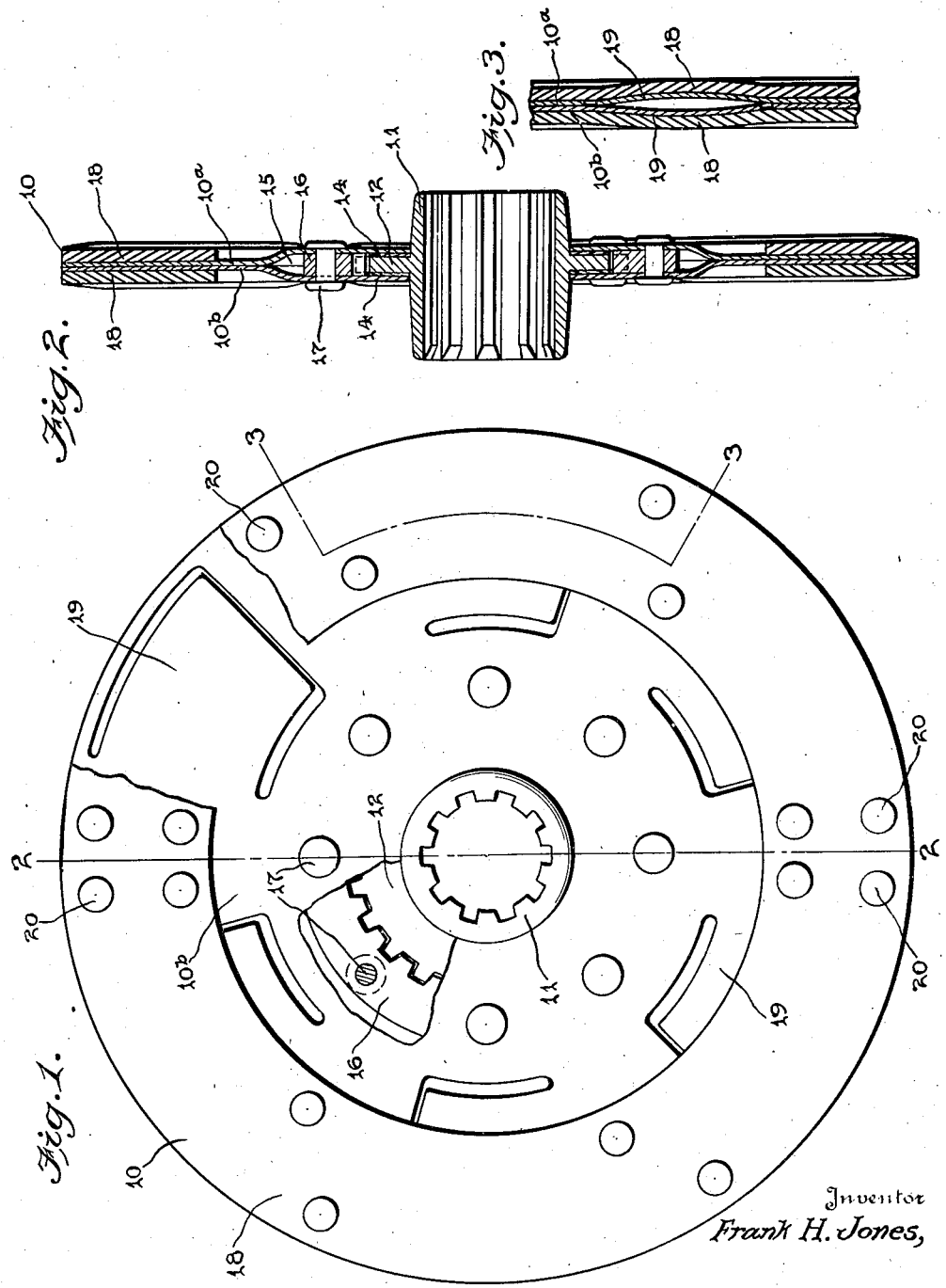
Inventor
Frank H. Jones,
By
Attorney Patented May 12, 1931

1,804,878

UNITED STATES PATENT OFFICE

FRANK H. JONES, OF UPPER SANDUSKY, OHIO

FRICTION CLUTCH DISK

Application filed October 29, 1929. Serial No. 403,260.

The object of the invention is to provide a friction disk for use in single or multiple disk clutches ordinarily used between the driving motor and transmission of a motor vehicle, so that, in engaging the clutch, to couple the motor to the transmission, the action will be smooth and without any jerks; to provide a clutch disk which will prevent the torsional vibrations in the crank shaft of the driving motor being reflected in the transmission; to provide a friction disk in which the metal structure is of laminated form to give more flexibility than a solid disk of the same thickness; to provide a disk in which the friction rings on both sides are carried on resilient seats without any tendency of the latter to cut or mar said rings; to provide a construction in which, in the engaging operation, the friction rings throughout their width at the cushioned points are engaged with the driving elements, so that there is no tendency to wear the rings more at one edge than at the other; to provide a disk construction in which the resilient seats for the friction rings are limited in movement to the normal plane of the disk, so that in full engagement the friction rings are in contact throughout with the faces of the driving elements; to provide a friction disk in which the friction ring seats are formed without severing the peripheries of the metal portions, thus making the latter stronger and not likely to crack or break; and to provide a friction disk in which the hub for connection with the transmission has a flexible connection with the remainder of the structure.

With this object in view the invention consists in a construction and combination of parts of which a preferred embodiment is illustrated in the accompanying drawings, wherein:

Figure 1 is an elevational view, partly broken away, of a friction clutch disk constructed in accordance with the invention.

Figure 2 is a sectional view on the plane indicated by the line 2—2 of Figure 1.

Figure 3 is a detail sectional view on the plane indicated by the line 3—3 of Figure 1.

The invention comprises the laminated disk 10, preferably of comparatively light-gauge metal and composed of a duality of laminae, as indicated at $10^a$ and $10^b$. The disk 10 has a flexible connection with the hub 11 which is of the usual form for sliding connection with the transmission shaft, and this flexible connection is secured by forming the hub with a peripheral flange 12 with which the laminae are engaged on opposite faces, friction washers 14 being interposed between them and the flange.

Adjacent the peripheries, the laminae $10^a$ and $10^b$ are in face contact but at the centers they are depressed or dished, the dishing being in opposite directions, so that a channel 15 is formed between them and in this channel is received a ring 16 which is rigidly secured to both laminae by means of rivets 17 which pass through the laminae and through the ring.

The ring 16 constitutes the means for effecting a positive driving connection between the plate and the hub, the flange 12 of the latter being formed with peripheral teeth and the ring being formed on the inner periphery with corresponding teeth which interlock with the teeth on the flange. By means of these interfitting teeth on the two and the ring being positively connected to the plate, the turning force imparted to the latter is transmitted to the hub.

The friction washers 14 interposed between the flange and the laminae provide a frictional connection between them and the hub flange and permit slight relative movement of the hub and plate which is possible due to the slight play in the interfitting teeth of the ring and flange. By this construction, the torsional vibrations of the crank shaft of a motor vehicle engine are not reflected in the transmission shaft of the vehicle.

To eliminate jerks and provide for a progressive and easy engagement of the friction disk with the driving elements of the clutch of which it is a part, the friction rings 18 which are secured to the plate on opposite faces and adjacent its periphery bear upon spring seats which belly or force out portions of the friction elements beyond the surface of the remainder. These resilient or spring seats consist of tongues 19 formed in each lamina and these tongues are formed by piercing each lamina on radially spaced arcuate lines and shearing them on uniformly spaced radial lines. The tongues are arched or bowed in the direction of their length and when the two laminæ are assembled, the tongues are reversely disposed. In the assembling, the laminæ are arranged to bring the tongues of the one directly behind those of the other and the taper portions of the tongues on one bear on the rear faces of the root portions of the tongues on the other. Rivets 20, arranged as shown in Figure 1, extend through the laminæ and through the friction rings 18, serving to secure the friction rings to the plate and also to assist in holding the laminæ together in the region of the friction rings. The rivets 20 are preferably of brass.

By reason of the arched or bowed formation of the tongues, the friction rings are bellied or extended in the region of the tongues beyond the normal planes of the rings and the bowing of the tongues being in the direction of their length, the friction rings are extended the same distance across their width and when the clutch elements are engaged, the bellied portions of the rings first come in contact with the driving parts making a relatively small area of contact which is gradually increased as the clutch elements are moved to full clutching engagement, the tongues yielding under the pressure of the clutch elements until they are flexed into the normal planes of their respective laminæ, when the full faces of the friction rings are then making contact.

The tongues in the improved construction are formed without severing the laminæ to their periphery, so that a stronger construction is provided than if the peripheral edges of the laminæ were cut. Also the employment of two laminæ leaves the tip edges of the tongues of the one bearing on the rear face of the other, so that in the flexation of the tongues they do not bear upon and abrade the opposite friction ring, as would be the case were the disk a single metal plate and the tongues struck from the same and deflected respectively from the planes of opposite faces.

In the construction of the disk, the formation of the tongues leaves them projecting a specified distance beyond the faces of their respective laminæ. When the friction rings are attached by being riveted, as shown, the tongues are deflected back toward the faces of the laminæ and they thus have a spring pressure against the friction rings and, as the latter become worn with continued usage, the pressure of the tongues being always present, the normal height of the friction rings in the regions of the tongues is maintained throughout the life of the rings.

The invention having been described what is claimed as new and useful is:

1. A friction clutch disk comprising a hub for connection with a driven shaft and formed with a circumferential flange, a laminated plate having friction elements adjacent its periphery and its laminæ disposed respectively on the opposite sides of said flange, a ring in surrounding relation to said flange and interposed between and secured to said laminæ, the ring and flange having interfitting teeth by which they are loosely interlocked.

2. A friction clutch disk comprising a hub for connection with a driven shaft and formed with a circumferential flange, a laminated plate having friction elements adjacent its periphery and its laminæ disposed respectively on the opposite sides of said flange, a ring in surrounding relation to said flange and interposed between and secured to said laminæ, the ring and flange having interfitting teeth by which they are loosely interlocked, and the flange having friction washers interposed between it and said laminæ.

3. A friction clutch disk comprising a laminated plate of which each lamina is formed with a circular series of bowed spring tongues, the tongues of one lamina being reversely disposed with respect to those of the other lamina, so that their tips are adapted to bear on the rear face of the other lamina, and friction elements secured to the opposite faces of the plate and crossing said tongues which constitute resilient seats for said elements.

4. A friction clutch disk comprising a laminated plate of which each lamina is formed with a circular series of bowed spring tongues, the tongues of one lamina being reversely disposed with respect to those of the other lamina but arranged directly behind the same, so that the tips of the tongues on the one are adapted to bear on the rear face of the other at the roots of the tongues thereof, and friction elements mounted on opposite sides of the plate and crossing said tongues which constitute resilient seats for said elements.

5. A friction clutch disk comprising a laminated plate of which each lamina is formed with a circular series of bowed spring tongues, the tongues of one lamina being reversely disposed with respect to those of the other lamina but arranged directly behind the same, so that the tips of the tongues on the one are adapted to bear on the rear face of the other at the roots of the tongues thereof, and friction elements mounted on opposite sides of the plate and crossing said tongues which constitute resilient seats for said elements, said elements being attached to the plate between the tongues but unattached to the latter.

6. A friction clutch disk comprising a laminated plate of which each lamina is pierced on radially spaced arcuate lines and severed on spaced radial lines to provide a circular series of spring tongues, the tongues being bowed in the direction of their length and those of one lamina being reversely disposed with respect to those of the other lamina, so that the tips of the tongues of the one are adapted to bear on the rear face of the other, and friction rings secured to said plate on opposite sides and crossing said tongues which constitute resilient seats for the same.

7. A friction clutch disk comprising a laminated metal plate of which each lamina is pierced on radially spaced arcuate lines and severed on spaced radial lines to provide a circular series of spring tongues which are bowed in the direction of their length, the tongues of one lamina being positioned directly behind those of the other lamina but reversely disposed with respect to the same, and friction rings positioned on the opposite faces of said plate and crossing said tongues, said rings being attached to the plate between the tongues but unattached to the tongues.

8. A friction clutch disk comprising a laminated plate of which each lamina is formed with a circular series of bowed spring tongues, the laminæ being so assembled as to dispose the tongues on opposite sides of the disk, the tips of the tongues of each lamina being adapted to bear against the reverse face of the other lamina, and friction elements secured to the opposite faces of the plate in spanning relation to said tongues which constitute resilient seats for said elements.

9. A friction clutch disk having a circular series of bowed spring tongues projecting from opposite faces but depressible into the plane of the disk, and friction elements spanning said tongues and secured to the disk at points between adjacent tongues to continuously tension said elements by the resilient pressure of the tongues.

In testimony whereof he affixes his signature.

F. H. JONES.